United States Patent
Mourier

[11] 3,727,125
[45] Apr. 10, 1973

[54] APPARATUS FOR MEASURING ELECTROSTATIC PROPERTIES OF MATERIALS

[75] Inventor: Marcel Mourier, Lyon, France
[73] Assignee: Rhone-Poulenc S.A., Paris, France
[22] Filed: Apr. 29, 1971
[21] Appl. No.: 138,545

[30] Foreign Application Priority Data
Apr. 29, 1970 France..................................7015725

[52] U.S. Cl......................................324/32, 324/72
[51] Int. Cl............................G01r 29/12, G01r 5/28
[58] Field of Search.........................324/32, 72; 317/3

[56] References Cited
UNITED STATES PATENTS
| | | | |
|---|---|---|---|
| 3,544,889 | 12/1970 | Alauzet | 324/32 |
| 3,344,344 | 9/1967 | Wales | 324/32 |
| 3,614,602 | 10/1971 | Ciotti | 324/32 |

Primary Examiner—Rudolph V. Rolinec
Assistant Examiner—Ernest F. Karlsen
Attorney—Stevens, Davis, Miller & Mosher

[57] ABSTRACT

Apparatus for measuring the electrostatic properties of materials in situ is generally portable, and consists of a casing with holes arranged along the circumference of a circle at one end of the casing, and a synchronous electric motor outside the casing at the other end, a rotor, driven by the motor, inside the casing, with an high tension electrode and a probe fixed in the rotor. The electrode, the probe, and the holes in the casing are at the same distance from the axis of the rotor. The electrode is connected to an high tension supply via a contact on the rotor contacting a circular track, and charges the material to be tested by the corona effect; the probe is connected to electronic sensing apparatus via contacts on the axis of the rotor, and responds to the charge on the material to be tested by induction.

8 Claims, 5 Drawing Figures

APPARATUS FOR MEASURING ELECTROSTATIC PROPERTIES OF MATERIALS

The present invention relates to apparatus for the measurement of the electrostatic properties of materials.

Apparatus has already been described whereby the examination, and precise and reproducible measurements can be made of the surface electrostatic characteristics of various materials, particularly plastics materials, possibly after antistatic treatment. In such apparatus, charging of the specimen is carried out by corona effect and discharging of the specimen may be measured as a function of time.

Such apparatus, however, necessitates bringing the material to be examined into the form of specimens, which entails cutting them into predetermined shapes and sizes, even if only one specimen has to be examined.

Such apparatus cannot be used for the non-destructive measurement of the electrical properties of materials and in particular, it cannot be used for measurements on the material in situ.

The electrostatic properties of materials, however, depend not only on their nature but also the conditions under which they are used and their environment, in particular where the material comprises a coating on a support the possibility of the removal of static electricity by their support. It is, therefore, often necessary to examine the materials under the exact conditions of their use.

An apparatus is known for measuring electrostatic charges "in situ". This apparatus comprises a friction element, the movement of which electrifies the surface to be examined. However, whatever precautions may be taken, it is impossible to ensure identical contact of the friction element in the course of successive tests and the results are not very reproducible.

In addition, friction modifies the surface state of the material examined, such that it is impossible to be certain that the measurement made really corresponds to the material "in situ".

It is therefore desirable to provide apparatus whereby can be achieved the non-destructive measurement of the electrical properties of a material, without having to take samples of this material, and without exerting friction on this material, it being possible to carry out the measurements, if desired, in situ.

According to the present invention there is provided apparatus for measuring electrostatic properties of materials, having an electrode and a probe mounted in, and equidistant from the axis of a rotor, the rotor being mounted adjacent to and rotatable relative to a fixed plate, there being holes in the fixed plate such that on rotation of the rotor both the electrode and the probe can separately be put opposite to each of the holes in turn. The apparatus is intended to be connected to a high-tension D.C. generator and to be a measuring unit in the form of a portable measuring head adapted to be applied to the material to be examined, and comprising a device ensuring without contact the charging of the material by corona effect, and a measuring probe adapted to permit the measurement of the charge acquired by the material and to follow the variation of the said charge with time.

In order that the invention may be better understood, the following description is given, merely by way of example, reference being made to the accompanying drawings in which.

Figure 1:
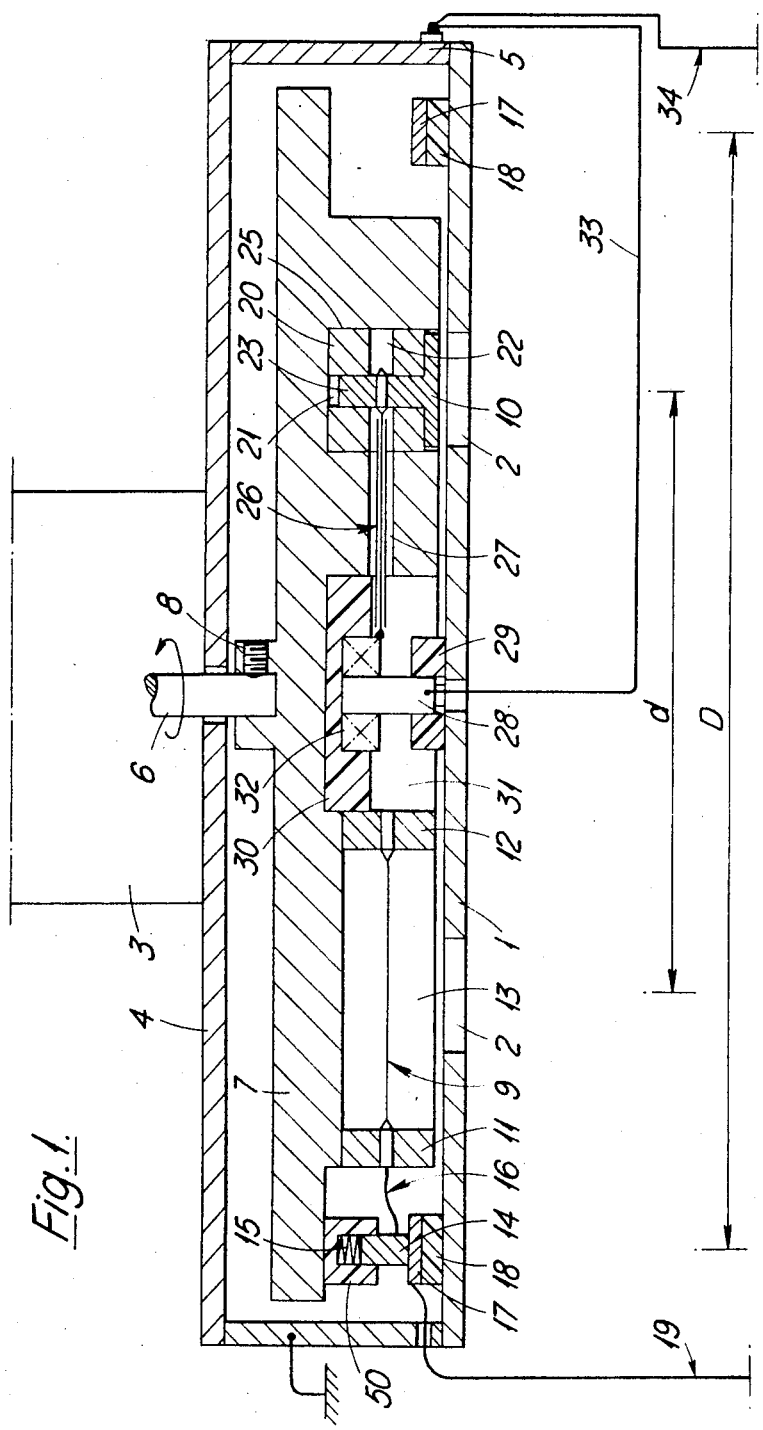
FIG. 1 is a view in section of the measuring head.

The measuring head, shown in FIG. 1, comprises a plane fixed plate 1 of conducting material, usually metallic, carrying an earthing terminal. This plate 1 is provided with equidistant openings 2 distributed over the circumference of a circle of diameter d. An electric motor 3 is fixed to a support 4 connected to the plate 1 by struts 5. These struts may be extended beyond the plate 1 by insulating feet, not shown, of a height of generally less than 5 mm. The shaft 6 of the motor is connected to a lead, not shown, for earthing it, and is arranged perpendicular to the plate 1 at the center of the previously defined circumference. A circular rotor 7 is fixed to the shaft 6; advantageously, it is secured by the screw 8 and can therefore be rotated by the motor. An electrode 9, charging by corona effect, and a measuring probe 10 are arranged on the face of the rotor 7 opposite the plate 1, parallel to the latter and at a mean distance from the axis of the rotor equal to the mean distance of the openings 2 to the center of the circumference of a circle of diameter $d$. A handle (not shown) may also be provided to facilitate manipulation of the measuring head.

The charging electrode 9, generally consisting of a radial metal wire, is held by two insulating supports 11 and 12, for example of polytetrafluorethylene mounted in a cylindrical recess 13 of the rotor 7. The charging electrode 9 is connected to a rotating contact 14 permitting its electrical connection to a high-tension D.C. generator. The rotating contact may be a carbon wiper 14 held by a spring 15 against a conducting circular track 17, for example metal, of mean diameter D. The carbon wiper 14 is connected to the electrode 9 by a sheathed wire 16. It is moved by the action of a spring 15 in the interior of a recess in insulating material 50 fixed to the rotor 7. The track 17 is fixed to the plate 1 by means of an insulating support of the same diameter. The track is electrically connected by a flexible cable 19 to a high-tension generator, the whole being constructed to permit raising the charging electrode to a positive or negative potential of between 2 and 20 kV.

Figure 3:
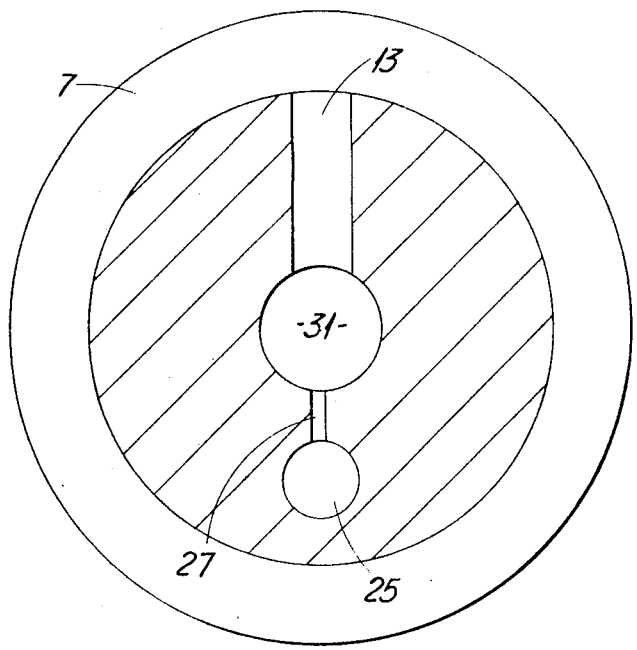
FIG. 3 is a view from below of the rotor of the measuring head along the section line cc of FIG. 4.
Figure 4:
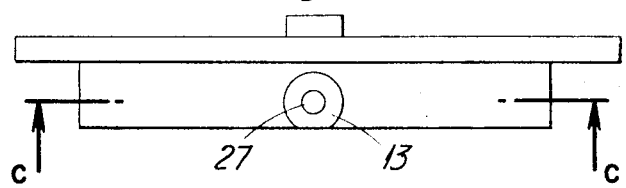
FIG. 4 is a view from the left of the rotor, positioned as in FIG. 1, of the measuring head.
Figure 5:
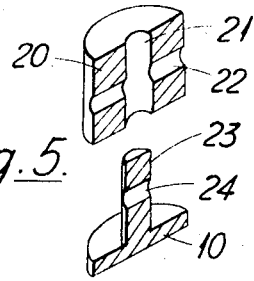
FIG. 5 is a sectional perspective view of the insulating bush and the measuring probe.

The measuring probe 10 consists (see FIG. 5) of a metal plate of area substantially equal to that of the openings 2. It is extended by an axial shank 23 and is insulated from earth by a supporting sleeve 20, for example of polytetrafluorethylene. Preferably, the shank of the probe is provided with a passage 24 and the sleeve is cylindrical and is provided with two passages, one 21 axial, the other 22 radial. The shank 23 is forcibly inserted in the passage 21 until the passages 22 and 24 are in line with each other. The sleeve 20 is fitted in the recess 25 of the table (see FIG. 3).

The probe 10, fixed to the rotor 7, is connected electrically to a rotating contact, and hence to the measuring elements. Preferably, the rotating contact and its electrical connection are composed as follows:

The contact comprises a ball bearing 32. The outer race of this bearing is connected to the probe 10 by a sheathed wire 26 housed in a passage 27 of the rotor 7, and in the passage 22 which is an extension of the passage 27. This race is held inside an insulator 30 secured to the rotor 7 inside a cylindrical recess 31. The inner race of the bearing is fitted around a fixed rod 28 held on the plate 1 by the insulating strut 29. The rod 28 is connected to the measuring instruments first by a sheathed wire 33 housed in a groove of the plate 1 as far as a strut 5, then from there by an armoured cable 34 to the control box shown in FIG. 2. (For greater clarity, the wire 33 has been shown in FIGS. 1 and 2 as being outside the plate 1.).

The openings 2 of the plate are preferably so distributed that the shortest distance between two consecutive openings is substantially equal to the width of an opening. Each opening has symmetry in a radical plane so as to provide; the dimensions of these openings and their interspacing are predetermined for providing a substantially sinuosoidal measuring signal. For facility of construction, it is preferable to use circular openings.

The probe has preferably the same shape as the openings. The openings and probes are circular and of the same diameter.

The measuring head according to the invention may, in use, be connected to any high-tension D.C. generator, the polarity of which may be selected and which may be capable of supplying a tension between 2 and 20 kV. Generally, the charging electrode is supplied with a tension of between 3 and 10 kV. The measuring probe may be connected to any conventional apparatus capable of measuring electrical charges.

Figure 2:
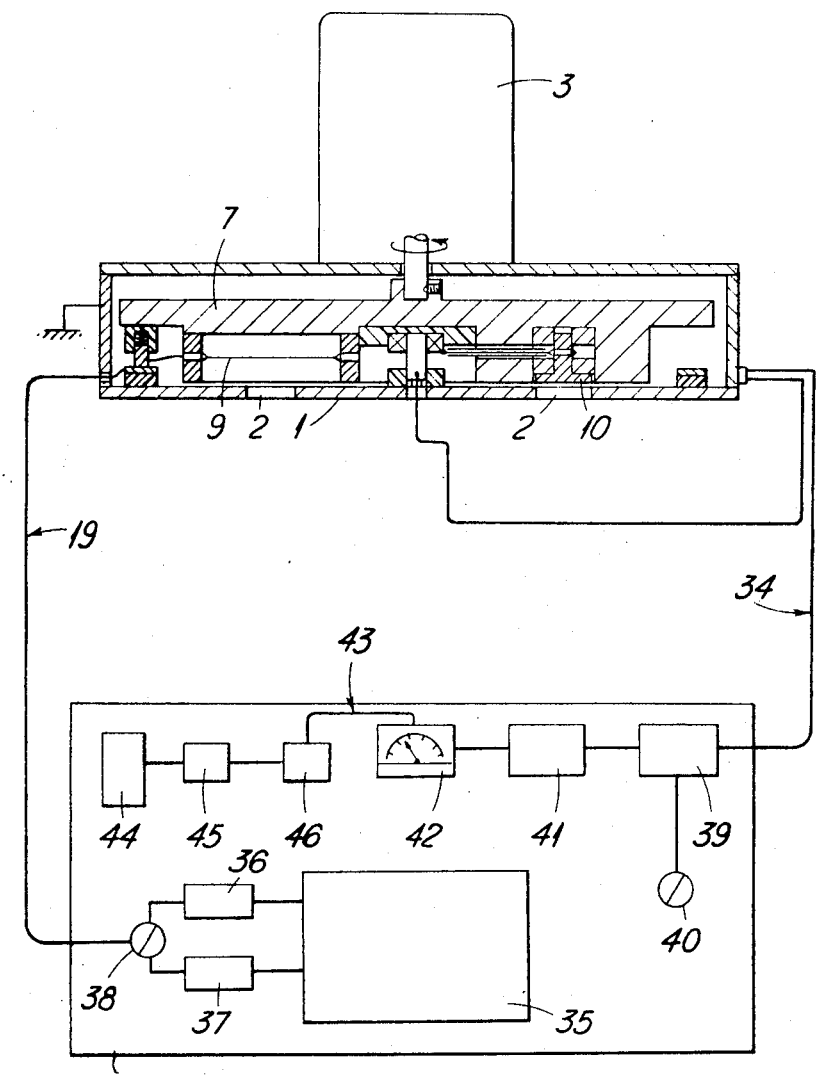
FIG. 2 is a diagrammatic view of the measuring head connected to a control box.

FIG. 2 shows the measuring head connected to a control box accommodating the high-tension generator and the measuring elements. A control box of this type permits full use to be made of the possiblities afforded by the measuring head. The charging electrode 9 is supplied by a conventional electrostatic generator 35 capable of supplying a continuous, effective high tension, the polarity of which may be selected by means of the high tension relays 36 and 37 and switch 38, connected by the connecting cable 19 to the contact track 17. An amplifier 39, connected to the probe 10 by a cable 34, leading to an insulated cable, is an amplifier 39 provided with a gain control by potentiometer 40. The amplifier is connected to a circuit 41 for detecting the amplified signal and to a moving coil milliammeter 42. Advantageously, there may also be added to the milliammeter a timing circuit 43 comprising a generator 44 supplying electrical pulses at regular intervals, and one or more pulse counters, such as 45, each controlled by a relay 46, itself actuated on the passage of the milliammeter needle. Thus the time taken by the charge assumed by the material to fall to half, quarter or any other preselected fraction of its initial value (half-discharge time, ¾ discharge time, etc.) is determined automatically.

The control box may be connected to the mains or possibly it may be supplied by an independent source of voltage.

The operation of the apparatus according to the invention is particularly simple. The apparatus having been connected to a high-tension generator and to a measuring apparatus, preferably to the previously described control box, to make a measurement for example on a sheet of plastics material, the latter is placed on a flat metal support connected to earth, and the plate 1 of the measuring head is placed on the sheet to be examined. The constant speed motor is started and rotates the rotor 7 and hence the charging electrode 9 and the measuring probe 10. A voltage is applied to the charging electrode after the desired polarity has been selected by means of the switch 38; the sheet is charged by corona effect.

When the measuring probe 10 is opposite an opening 2 allowing the charged specimen to appear, it acquires a charge by induction. This charge is substantially proportional to the potential to which the specimen is raised and to the capacitance of the probe relative to the specimen. During the rotation of the rotor 7, the area of the probe opposite the specimen varies, the capacitance of the whole varies and consequently so does the charge acquired by the probe.

The input circuit of the amplifier 39, to which the probe 10 is connected by the cable 34, is composed of resistances and consequently offers slight reactance; therefore the input signal received by the amplifier is proportional to the variation in time of the electric field to which the probe is subjected during its passage past the specimen opposite the openings. As a first approximation, the curve of variation of the signal is the derivative with respect to time of the charge acquired by the probe. This charge, first increasing and then decreasing, alternates. Since the probe is periodically adjacent to two consecutive openings, two consecutive periods succeed each other without discontinuity and the variation of the potential of the probe appears in the form of an alternating periodic signal, which is easily amplified and detected. The amplitude of the signal is proportional to the potential to which the specimen is raised.

The charging voltage is maintained for the necessary time (generally between 5 and 50 seconds) for the specimen to acquire a maximum charge; the gain control 40 of the amplifier 39 is operated to bring the needle of the milliammeter 42 to a predetermined position. The charging electrode is then disconnected from the voltage, which triggers the operation of the pulse generator 44 for producing on the pulse counters 45 the automatic display of the times of half-discharge, three-quarter discharge and generally preselected discharge fractions.

Before making measurements with the apparatus described, it may be necessary to calibrate it for verifying that it is functioning properly, for example after transport. To perform this calibration, it is possible for example to place under the plate 1 of the measuring head a conducting metal sheet insulated from the said plate and from earth. This plate is raised to a known potential supplied directly by the the control box, the motor is started and the measuring circuit is connected up. The needle of the milliammeter 42 is then brought to a predetermined value (corresponding to the maximum of the scale) by means of the potentiometer 40 and the value indicated by the potentiometer index is read. The apparatus is in working order when the value as read corresponds to the value predetermined in the laboratory.

During a measurement "in situ", for example on paint covering a wall, the apparatus may be used in two distinct ways for determining the characteristics of either the material alone (paint) or the material of its support. In the first case, the plate 1 of the measuring head is placed directly on the paint. In the second case, highly-insulating feet (not shown) are placed between the plate 1 and the material.

It may sometimes be of interest to obtain the charging and discharging curve of the material examined. For this purpose, it is possible to connect the automatic discharge time display device to an oscilloscope or to a recorder (not shown).

For the exact determination of discharge times less than a second, the use of an oscilloscope or recorder is necessary.

The apparatus shown in FIG. 1 may be the object of various embodiment modifications. For example, the ball bearing 32 may be replaced by a roller or needle bearing. It is also possible to use corresponding ball, roller or needle thrust bearings. Preferably, these elements are sealed, particularly against dust.

Transmission of the measuring signal may also be effected by means of a rotating contact formed by a flexible blade wiping a shaft. The track 17 of the rotating contact supplying the charging electrode may be arranged on a diameter less than that of the recess 31. It may also be fixed either to the plate 1, support 4, or struts 5. It is also possible to change over the connections of the rotating contacts. Many other modifications will occur to the person versed in the art.

By means of the apparatus according to the invention, it is possible to examine and measure the electrostatic properties of materials capable of being charged and discharged as a function of time. It is possible in particular by its means to examine materials in the non-fluid state, such as solid materials, for example paints on supports, tiles, plates or slabs of plastics materials, flexible materials such as fabrics, moquettes, carpets, films sheets, pasty materials capable of supporting the measuring head during the measurement, such as gums. It enables measurements to be made on surfaces coated with antistatic agents, which do not react well to friction test. In addition, it enables measurements to be made "in situ" on paintings, coatings directly on their support and in any position of the measuring head, for example on walls, ceilings, etc.

The apparatus is well adapted for making measurements on materials having plane or substantially plane surfaces relative to the dimensions of the measuring head.

The apparatus according to the invention also permits, if desired, the simultaneous examination of a number of specimens of the same thickness, possibly as many specimens as there are openings 2 in the plate. For this purpose, the measuring circuit comprises a cathode ray oscilloscope as signal detector; the scanning speed of the oscilloscope is synchronised with the speed of rotation of the rotor. There are thus caused to appear on the oscilloscope screen as many peaks as there are specimens opposite the plate 1.

It is also possible to use only the measuring circuit of the apparatus without previously charging the specimen by corona effect. Such possibility occurs in the case of measurements "in situ", when the material is already charged naturally and when, for example, the best way is being sought for removing the electrostatic charges present.

The apparatus thus described permits exact and reproducible measurements and the results are immediately utilisable, as the following examples will show.

EXAMPLE 1

Measurements made by placing the material to be measured on a flat conducting support connected to earth.

The apparatus used is that shown in FIGS. 1 to 5. The part of the measuring head in contact with the material is a plane, fixed, square plate of the size 150 × 150 mm, of duralumin 1mm thick. This plate, earthed, is provided with 9 circular openings 14 mm in diameter, equidistant, situated at equal distances relative to the center of the plate on a circumference of diameter $d = 80$ mm. A synchronous electric motor, rotating at a speed of 1500 rev/min rotates the duralumin circular rotor 7 having a diameter of 150mm.

The charging electrode 9, consisting of a tungsten wire 20 mm long and 20 microns in diameter, is arranged radially on the table in the axis of the cylindrical recess 13, having a diameter of 20 mm, and at a distance of 11 mm relative to the plate 1. The electrode is connected to a high-tension generator supplying under load a continuous tension of ± 4,100 volts.

The brass measuring probe is plane, circular with a diameter of 15 mm, insulated from the table by a sleeve 20 of polytetrafluorethylene which holds it in the recess 25 of the table. The distance of the measuring probe to the plate 1 is 1 mm.

The electrical signals received by the measuring probe are transmitted by the sheathed wire 26 to the outer race of a rigid ball bearing, sealed against dust, of internal diameter 4 mm, external diameter 15 mm, thickness 5 mm. The wire 26 is soldered to the outer race of the ball bearing.

The apparatus may be used as follows:
a. The specimen (without needing to be previously cut out) is placed on a flat metal plate connected to earth, and the measuring head, duly connected to a control box as previously described, is is placed on the said specimen,
b. the constant speed motor is started,
c. the charging electrode is connected to voltage,
d. the milliammeter needle is brought to the graduation 100 (maximum of the milliammeter) by operation of the potentiometer.

The position assumed by the potentiometer index indicates the potential acquired by the specimen,
e. the charging electrode is disconnected from voltage and the counting device is started.

Using various specimens, the following results are obtained:

| Specimens | Thickness in microns | Potential acquired in volts | Discharge time in sec. | |
|---|---|---|---|---|
| | | | ½ discharge | ¾ discharge |
| Ethylene glycol polyterephthalate | 190 | 750 | >1000 | |
| regenerated cellulose | 15 | 30 | < 1 | 1 |
| Cellulose diacetate | 1000 | 650 | 10 | 27 |
| Carpet | | 750 | 3 | 10 |

| Specimens | | | | |
|---|---|---|---|---|
| Working clothing (80% vinyl polychloride) (20% ethylene glycol polyterephthalate) without antistatic treatment | 450 | 650 | 3 | 14 |
| The same working clothing with antistatic treatment | 450 | 25 | <1 | <1 |

EXAMPLE 2

Measurements made "in situ" by placing the measuring head directly on the specimen.

The apparatus used is the same as that described in example 1.

Various measurements have given the following results:

| Specimens | Potential acquired in volts | Discharge time in sec. | |
|---|---|---|---|
| | | ½ discharge | ¾ discharge |
| Glycerophthalic paint on a wall | 50 | <1 | <1 |
| Paving stones on ground | 150 | <1 | <1 |
| Carpet on ground | 500 | 4 | 14 |
| Paint on motor car body | 550 | 22 | 113 |
| Motor car seat of plastics material based on polyvinyl chloride | 180 | <1 | 1 |
| Porcelain tiles on laboratory matting | 450 | 13 | 28 |

EXAMPLE 3

Measurements made "in situ" with insulating feet placed between the measuring head and specimen.

The insulation between the specimen and the measuring head was provided by 3 feet, 2 mm thick, of silicone elastomer.

The apparatus used is that described in example 1.

| Specimens | Potential acquired in volts | Discharge time in sec. | |
|---|---|---|---|
| | | ½ discharge | ¾ discharge |
| Porcelain tiles on laboratory matting | 450 | 40 | 160 |
| Paint on motor car body (same as example 2) | 500 | 39 | 151 |
| Paving stones on ground | 150 | <1 | <1 |

We claim:

1. Apparatus for measuring the electrostatic properties of materials, comprising in combination;
   a. A fixed plate;
   b. A rotor mounted to rotate about an axis perpendicular to said fixed plate;
   c. Means defining holes in said fixed plate, the holes lying along the circumference of a circle, the center of said circle lying on said axis of said rotor.
   d. An electrode and a probe fixed to said rotor and spaced apart from one another in positions whereby both the electrode and the probe separately overlie each of said holes in turn when the rotor rotates;
   e. Means for charging said electrode; and
   f. Means for detecting the charge on said probe thereby detecting the charge on said material.

2. Apparatus according to claim 1 further comprising a motor carried by said fixed plate for rotating said rotor at a constant speed.

3. Apparatus according to claim 1 further comprising means for measuring the time taken for the charge on the probe to fall to a preselected fraction of the charge on the probe at some previous time.

4. Apparatus according to claim 1 further comprising a bearing of the ball, needle or roller type for the rotor and wherein the means for detecting the charge on the proble includes a contact to the bearing.

5. Apparatus according to claim 1 wherein said holes in said fixed plate are identical and are regularly distributed over said circumference of said circle.

6. Apparatus according to claim 1 wherein the fixed plate is of a conducting material and is earthed.

7. Apparatus according to claim 1 wherein the holes in said fixed plate are circular and of the same diameter, their centers are spaced apart by a distance equal to twice the diameter of one of the holes, the charging electrode is a length of wire arranged radially to the rotor, the probe is arranged on the rotor diametically opposite to the electrode, and the probe includes a metal disc of approximately the same diameter as the holes in the fixed plate.

8. Apparatus according to claim 1 further comprising a member fixed to said rotor and contacting a circular track, the circular track being fixed to said fixed plate, whereby it is possible to charge the electrode to a voltage of between 2 kV. and 20 kV.

* * * * *